United States Patent [19]

Siddiq

[11] Patent Number: 4,893,209
[45] Date of Patent: Jan. 9, 1990

[54] MULTIFUNCTIONAL MAGNETIC HEAD CLEANING MEDIA

[75] Inventor: Mohammed Siddiq, San Jose, Calif.

[73] Assignee: Tandy Corporation, Fort Worth, Tex.

[21] Appl. No.: 182,825

[22] Filed: Apr. 18, 1988

[51] Int. Cl.$^4$ ............................................... G11B 5/41
[52] U.S. Cl. .................................................... 360/128
[58] Field of Search ............... 360/128, 137, 131, 132, 360/133, 134, 135

[56] References Cited

U.S. PATENT DOCUMENTS

| | | | |
|---|---|---|---|
| 3,823,947 | 7/1974 | Sasaki et al. | 360/128 |
| 3,978,520 | 8/1976 | Nowicki et al. | 360/128 |
| 4,387,411 | 6/1983 | Clausen et al. | 360/128 |
| 4,422,119 | 12/1983 | Kawakami et al. | 360/128 |
| 4,586,100 | 4/1986 | Howe et al. | 360/128 |
| 4,682,257 | 7/1987 | Neuman | 360/128 |
| 4,724,484 | 2/1988 | Ward | 360/27 |

FOREIGN PATENT DOCUMENTS

| | | | |
|---|---|---|---|
| 58-19776 | 2/1983 | Japan | 360/128 |
| 58-62819 | 4/1983 | Japan | 360/128 |
| 59-16124 | 1/1984 | Japan | 360/128 |
| 61-115217 | 6/1986 | Japan | 360/128 |
| 61-120322 | 6/1986 | Japan | 360/128 |
| 61-192015 | 8/1986 | Japan | 360/128 |
| 61-192016 | 8/1986 | Japan | 360/128 |
| 61-192017 | 8/1986 | Japan | 360/128 |
| 61-206914 | 9/1986 | Japan | 360/128 |
| 62-112208 | 5/1987 | Japan | 360/128 |
| 62-129930 | 6/1987 | Japan | 360/128 |
| 62-159320 | 7/1987 | Japan | 360/128 |
| 62-259215 | 11/1987 | Japan | 360/128 |

OTHER PUBLICATIONS

3M Flyer #84-9811-1910-3(19720)TP, copyright 1986.
3M Flyer #84-9811-1900-5(126.5)TP, 1986.
Memorex, Safeguard System Brand Video Head Cleaner brochure, copyright 1986 Memtek Products.

Primary Examiner—John H. Wolff
Assistant Examiner—Matthew J. Bussan
Attorney, Agent, or Firm—Townsend and Townsend

[57] ABSTRACT

A multifunctional cleaning tape (2) is used as part of a video cassette (7) for cleaning the magnetic head of a VCR (12) and providing diagnostic/instructional information to the user. The tape includes a first, non-magnetic cleaning segment (4) for cleaning the magnetic head followed by a magnetic diagnostic/instructional segment (6) containing prerecorded diagnostic/instructional information which is played to the user. The diagnostic/instructional information includes information relating to the cleanliness of the magnetic head and for adjusting the VCR for improved visual and audio output and tape tracking. The transition to the diagnostic/instructional segment is hidden by recording electronic noise at the initial portion (26) of such segment.

9 Claims, 1 Drawing Sheet

| 4 | 10 | 24 | 10 | 22 | 18 | 26 | 6 |
|---|---|---|---|---|---|---|---|
| CLEANING | | SECOND CLEANING | | POLISHING | | | DIAGNOSTIC/INSTRUCTIONAL |

FIG._1.
FIG._2.
FIG._3.
FIG._4.
FIG._5.
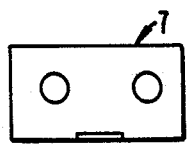
FIG._6.
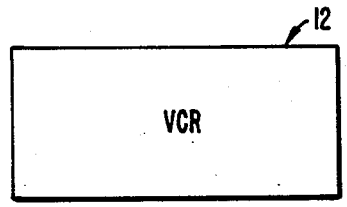
FIG._7.

MULTIFUNCTIONAL MAGNETIC HEAD CLEANING MEDIA

BACKGROUND OF THE INVENTION

The cleaning of magnetic tape drives, in particular the magnetic heads and other transport components, has often been accomplished using a cleaning tape mounted in a cassette. The cleaning tape was specially made to clean the magnetic head and transport components. The user would load the cassette in the machine and let the machine run for a period of time. A prerecorded magnetic tape of known good quality would then be played in the machine to make a somewhat crude determination of the cleaning effectiveness.

One type of cleaning tape has a carrier film coated with magnetic iron oxide in a binder. This is a relatively abrasive tape which, although providing some cleaning effectiveness, is rather hard on the magnetic heads. Also, such cleaning tapes are not used in a wet format since conventional solvents attack the magnetic coatings.

U.S. Pat. No. 3,978.520 to Nowicki et al. discloses a magnetic cleaning tape having an abrasive magnetic coating of a particular character, the tape having a recorded video test pattern. The concept behind this invention is that the cleaning tape is run through the VCR until a clear test pattern is viewed, which indicates that the magnetic head is clean. The user then immediately halts playing of the cleaning tape to reduce excessive abrasion of the magnetic head. However, with this concept the cleaning tapes adds the same type of contamination the cleaning tape is attempting to remove, that is the abrasive magnetic coating and binder. Also to remove the contaminants on the head, the abrasive magnetic coating must necessarily be quite abrasive itself. Since the quality of the recorded message is relative to the size of the abrasive magnetic particles, the relatively large particles necessary to create sufficient abrasion restricts the quality of the signal produced.

SUMMARY OF THE INVENTION

The present invention is directed to a multifunctional magnetic head cleaning media which both cleans the magnetic head and provides diagnostic/instructional information for the user. The cleaning media includes a magnetic head cleaning segment and a diagnostic/instructional segment. The cleaning media can be in the form of a tape or magnetic computer disc. For simplicity the media will usually be described in terms of a tape; however, the invention is not limited to tape.

The magnetic head cleaning segment may be of various types. Preferably it is the type in which a fabric layer is bonded to a polymeric film substrate. Alternatively the cleaning segment is a homogeneous type disclosed in copending patent application Ser. No. 07/182,829, entitled HOMOGENEOUS MAGNETIC HEAD CLEANING MATERIAL, assigned to the common assignee of this application and filed on the same date as this application, the disclosure of what is incorporated by reference. Using such cleaning materials for the cleaning tape segment eliminates the harmful effects caused by the use of highly abrasive magnetic coatings as the cleaning agent. More than one cleaning segment can be used, the cleaning segments preferably being of different types for maximum cleaning effectiveness. If desired, a polishing segment can be used following one or more of the cleaning segments to polish the magnetic head thus improving the performance of the magnetic head. The diagnostic/instructional segment is typically following (that is, upstream of) the cleaning segment. However, the diagnostic/instructional segment could be positioned before the cleaning segment or between two cleaning segments as well.

The invention finds great utility when used with a video cassette recorder (VCR). In this application VCR will be used to indicate video cassette recorders, video cassette players, combined video cassette recorders and players and similar equipment. The multifunctional tape is preferably incorporated in a video cassette and is used by playing the multifunctional tape on the VCR. The one or more cleaning segments clean the magnetic head, and other transport components. Preferably, the diagnostic/instructional information recorded on the corresponding tape segment is then provided the user. This information can simply provide the user with color test bars allowing the user to adjust color, contrast, etc. to achieve the desired fidelity. In addition to or in lieu of this, step-by-step instructions can be provided on the diagnostic/instructional segment which would enable a casual user to properly make the necessary adjustments to the VCR. Typically the diagnostic/instructional segment would also be used to check for the effectiveness of the cleaning of the magnetic head.

The present invention, since not relying upon highly abrasive magnetic coatings for cleaning and message recording, can use liquid cleaners with the cleaning segments. The invention eliminates any compromise of cleanability versus prerecorded signal quality as can occur in other dual function tapes in which the cleaning and diagnostic information are coextensive. The invention is a great improvement over monofunctional cleaning tapes or diagnostic tapes since the tape made according to the invention provides immediate feedback to the user to determine the state of performance of the machine and instructional capability to derive maximum performance out of the machine.

One of the problems with splicing magnetic tape and non-magnetic tape segments together is the signal produced as the magnetic head passes the transition area at the splice. With a prerecorded video tape, this will cause the audio and visual output to be nothing but a blend of rolling random noise and a scrambled mixture of audio/visual signals as the magnetic head passes the splice. Because of this, the user may believe that there is something wrong with the tape or their VCR. To eliminate this momentary appearance of confusing signal, it is possible to hide this transition area in the following manner. Actual recording of desired audio or video signals in the diagnostic/instructional area can be displaced a distance upstream of the splice on the magnetic video tape. Electronic noise or "snow" can be recorded in the gap on the video tape between the splice and the beginning of the recorded diagnostic/instructional information. During playback, the output from the magnetic head will be about the same as the non-magnetic cleaning/polishing segment(s) pass the head as when the splice area and gap area pass the head. The output will therefore appear to be electronic noise or "snow" for the entire time the head passes the nonmagnet cleaning/polishing segment(s) followed by the recorded diagnostic/instructional message; the transition area will be effectively hidden.

Other features and advantages of the invention will appear from the following description in which the preferred embodiments have been set forth in detail in conjunction with the accompanying drawing.

BRIEF DESCRIPTION OF THE DRAWING

FIGS. 1–3 illustrate three embodiments of the invention including a single cleaning segment, a cleaning segment and a polishing segment and two cleaning segments and a polishing segment, all followed by a diagnostic/instruction segment.

FIG. 4 illustrates an additional embodiment of the invention in which the cleaning and polishing segments follow the diagnostic/instructional segment.

FIG. 5 illustrates an embodiment in which the embodiment of FIG. 4 is followed by a second diagnostic/instructional segment.

FIG. 6 illustrates a cassette containing a cleaning tape made according to the invention.

FIG. 7 shows a VCR used to play the cassette of FIG. 6.

DETAILED DESCRIPTION OF THE PREFERRED EMBODIMENTS

Referring now to FIG. 1, a multifunctional magnetic tape 2 is shown to include a cleaning segment 4 followed by a diagnostic/instructional segment 6. Tape 2, typically stored in a cassette 7, see FIG. 6, moves in the direction of arrow 8 so that segment 6 is considered upstream of segment 4. Segments 4, 6 are spliced at transition area 10 by conventional techniques. Cleaning segment 4 may be any type of commercially available magnetic head cleaning tape including multi-layered tapes having either an abrasive coating or a fibrous cleaning surface. Preferably the cleaning segment is the fabric layered type or a homogeneous polymeric tape having a matte finish with a roughness of about 0.5 $\mu$m. A commercially available homogeneous polymeric material sold by ICI Americas Inc. of Wilmington, Del. under the product designation Melinex 377/75 or 378/75 can be used as cleaning segment 4. Cleaning segment 4 can be used in dry or wet mode.

Typically cleaning segment 4 will run for 10 to 30 seconds while diagnostic/instructional segment 6 will run for about 1 to 2 minutes or longer depending upon the information to be provided the user. The diagnostic/instructional information recorded on segment 6, when multifunctional tape 2 is intended for use with a VCR 12, see FIG. 8, can, for example, include color bars for proper color adjustment, information to permit proper tracking adjustments and other types of information which may be helpful for the user in determining how effectively cleaning segment 4 has cleaned the magnetic head of the VCR and how well the VCR has been adjusted.

The present invention is expected to find great utility for use by VCR owners, not necessarily technicians. If intended for use by technicians, the diagnostic/instructional information recorded on segment 6 can be of the type suitable for use by a technician who can make internal adjustments to the VCR. The type and length of the diagnostic/instructional information can therefore be chosen according to the particular environment and need.

FIG. 2 shows an alternative multifunctional tape 16 including cleaning segment 4, diagnostic/instructional segment 6 and a polishing segment 18 spliced between segments 4 and 6. Polishing segment 18 has a surface which, after the magnetic head has been cleaned by segment 4, acts to polish the surface of the magnetic head to improve the operational performance of the magnetic head.

At FIG. 3 a multifunction tape 22 is shown. Tape 22 is similar to tape 16 but also includes a second cleaning segment 24 spliced between segments 4 and 18. Second cleaning segment 24 may be of the same type as cleaning segment 4. However, it is preferred that second cleaning segment 24 be of a different type than first cleaning segment 4 so to provide added cleaning effectiveness by tape 22.

Transition areas 10 between the various segments can create a noticeable interruption to the use as the transition area passes the magnetic head. Although for a service technician such an interruption would be ignored as normal, a consumer using one of the multifunctional tapes may find the disruption in the signal to be cause for alarm. Accordingly, transitional area is hidden or masked by recording electronic noise or "snow" in a gap 26 in diagnostic/instructional segment 6 adjacent polishing segment 18 of tape 22 (FIG. 3) and adjacent cleaning segment 4 of tape 2 (FIG. 1). When tape 2 or 22 is played, the signal produced as the magnetic head passes non-magnetic segments 4, 18 will be substantially the same as produced as the magnetic head passes gap 26 so to hide or mask transition areas 10 between segments 4 and 6 of tape 2 and segments 18 and 6 of tape 22.

Multifunction tape 2 is commonly incorporated into a conventional video cassette. The video cassette containing tape 2 (or 16 or 22) is inserted into the VCR and played through an appropriate monitor. Initially the magnetic head and transport components are cleaned by cleaning segment 4, and, if present, by cleaning segment 24, and then the magnetic head is polished by polishing segment 18 if present. Following cleaning and any polishing, diagnostic/instructional segment is played through the VCR on the monitor providing the user with information as to the cleaning effectiveness of the cleaning tape, adjustments needed to the VCR and instructions to accomplish the necessary adjustments. Thereafter the cassette with multifunction tape 2 is removed and the VCR is ready to be once again used.

FIGS. 4 and 5 show further multifunctional tapes 30, 32. Tape 30 is similar to tape 2 but with segment 6 preceding segments 4 and 18 rather than following. Tape 32 is similar to tape 30 but also includes a second diagnostic/instructional segment 34 upstream of polishing segment 18. The use of separated diagnostic/instructional segments 6, 34 maybe useful to provide the user with an almost instantaneous indication of cleaning effectiveness using before and after views.

Modification and variation can be made to the disclosed embodiments without departing from the subject of the invention as defined in the following claims. The preferred embodiments have been discussed in terms of a VCR. The invention can be used with other types of magnetic media, including audio tapes and computer discs, and with other types of equipment, including instrumentation equipment, computer disc drives and digital tape drives.

WHAT IS CLAIMED IS:

1. A multifunctional cleaning medium comprising:
   a magnetic head cleaning segment;
   a diagnostic/instructional segment containing diagnostic/instructional information for the user; and
   means for masking the transition between the cleaning segment and the diagnostic/instructional segment, the masking means including a gap portion of the diagnostic/instructional segment, the gap portion having electronic noise recorded thereon.

2. The medium of claim 1 further comprising a magnetic head polishing segment positioned in an upstream direction relative to the cleaning segment.

3. The medium of claim 2 wherein the polishing segment is positioned in a downstream direction relative to the diagnostic/instructional segment, the downstream direction being operationally opposite the upstream direction.

4. The medium of claim 3 further comprising a second magnetic head cleaning segment between the first mentioned cleaning segment and the polishing segment.

5. The medium of claim 1 further comprising a second magnetic head cleaning segment between the first mentioned cleaning segment and the diagnostic/instructional segment.

6. The medium of claim 5 wherein the second cleaning segment is of a different type than the first mentioned cleaning segment.

7. The medium of claim 1 wherein the cleaning segment is positioned in an upstream direction relative to the diagnostic/instructional segment.

8. The medium of claim 1 wherein the cleaning segment is positioned in a downstream direction relative to the diagnostic/instructional segment.

9. The medium of claim 8 further comprising a second diagnostic/instructional segment positioned in the downstream direction relative to the cleaning segment.

* * * * *